United States Patent
Oh et al.

(10) Patent No.: US 7,590,166 B2
(45) Date of Patent: Sep. 15, 2009

(54) APPARATUS AND METHOD FOR CANCELING AN INTERFERENCE SIGNAL IN A MOBILE COMMUNICATION SYSTEM USING MULTIPLE ANTENNAS

(75) Inventors: Hyun-Seok Oh, Incheon (KR); Hyun-Seok Yu, Seoul (KR); Hye-Jeong Lee, Suwon-si (KR); Gin-Kyu Choi, Seoul (KR); Yong-Suk Moon, Suwon-si (KR); Jung-Hoon Joo, Suwon-si (KR); Su-Jin Yoon, Suwon-si (KR)

(73) Assignee: Samsung Electronics Co. Ltd., Suwon-si (KR)

( * ) Notice: Subject to any disclaimer, the term of this patent is extended or adjusted under 35 U.S.C. 154(b) by 664 days.

(21) Appl. No.: 11/001,704

(22) Filed: Dec. 2, 2004

(65) Prior Publication Data

US 2005/0232341 A1    Oct. 20, 2005

(30) Foreign Application Priority Data

Dec. 2, 2003    (KR) .................. 10-2003-0086931

(51) Int. Cl.
*H04B 1/00* (2006.01)
*H04B 1/10* (2006.01)
*H04L 1/02* (2006.01)

(52) U.S. Cl. .................. 375/148; 375/267; 375/349
(58) Field of Classification Search .................. 375/130, 375/260, 147–148, 262, 267, 285, 341, 346, 375/347, 349; 370/332–334
See application file for complete search history.

(56) References Cited

U.S. PATENT DOCUMENTS

| | | | | |
|---|---|---|---|---|
| 6,069,912 A * | 5/2000 | Sawahashi et al. | .......... | 375/142 |
| 6,205,166 B1 * | 3/2001 | Maruta et al. | ............... | 375/130 |
| 6,618,433 B1 * | 9/2003 | Yellin | .......... | 375/148 |
| 6,757,337 B2 * | 6/2004 | Zhuang et al. | ............... | 375/267 |
| 6,967,175 B1 * | 11/2005 | Ahmed et al. | ............... | 438/753 |
| 7,020,175 B2 * | 3/2006 | Frank | .......... | 375/130 |
| 2002/0196842 A1 * | 12/2002 | Onggosanusi et al. | ....... | 375/148 |
| 2003/0189999 A1 * | 10/2003 | Kadous | ................. | 375/349 |
| 2004/0105489 A1 * | 6/2004 | Kim et al. | .......... | 375/140 |

* cited by examiner

*Primary Examiner*—Khanh C Tran
(74) *Attorney, Agent, or Firm*—Roylance, Abrams, Berdo & Goodman, L.L.P.

(57) ABSTRACT

An apparatus and a method for improving the performance of an error correction code in response to the influence of error propagation are disclosed. A receiver of a mobile communication system, which transmits/receives data at a high speed by means of the plurality of transmission antennas and the plurality of reception antennas, estimates a transmission signal of a specific path from a first received signal according to a preset criterion, measures an error component for each symbol of the estimated transmission signal, performs an error correction for symbols having a corresponding error component exceeding a preset value, detects transmission data from all symbols through a predetermined signal reverse-processing procedure, reconstructs a transmission signal from the transmission data, subtracts the reconstructed transmission signal from the received signal to generate a second received signal, and repeats the above operations until transmission data of all paths are detected from the second received signal.

14 Claims, 7 Drawing Sheets

APPARATUS AND METHOD FOR CANCELING AN INTERFERENCE SIGNAL IN A MOBILE COMMUNICATION SYSTEM USING MULTIPLE ANTENNAS

PRIORITY

This application claims the benefit under 35 U.S.C. 119(a) of an application entitled "Apparatus And Method For Canceling Interference Signal In Mobile Communication System Using Multiple Antenna" filed in the Korean Intellectual Property Office on Dec. 2, 2003 and assigned Ser. No. 2003-86931, the entire contents of which are incorporated herein by reference.

BACKGROUND OF THE INVENTION

1. Field of the Invention

The present invention relates to a multi-input multi-output (multiple antennas) mobile communication system. More particularly, the present invention relates to an apparatus and a method for improving the performance of an error correction code in response to the influence of error propagation.

2. Description of the Related Art

A conventional mobile communication system provides a voice-service and mainly uses channel coding to overcome unfavorable channel conditions. However, a multimedia service of high quality increases the necessity for a next generation wireless transmission technology that can transmit a large quantity of data with few errors. In particular, high speed transmission is more important in a forward link having a high transmission quantity of data. However, in a mobile communication system, the reliability of a signal is largely reduced due to fading, shadow, wave attenuation, noise, interference, etc. In particular, fading due to a multi-path causes severe signal distortion due to the sum of signals which are received through different paths and have different phases and sizes. Since the fading must be overcome to support high speed data communication, research into the fading has been actively pursued. Accordingly, a multi-input multi-output ('MIMO') technology using a plurality of transmission/reception antennas has been proposed. The MIMO simultaneously transmits data to a transmitter and a receiver by means of multiple antennas, thereby transmitting a large quantity of data without increasing transmission bandwidth.

Figure 1:
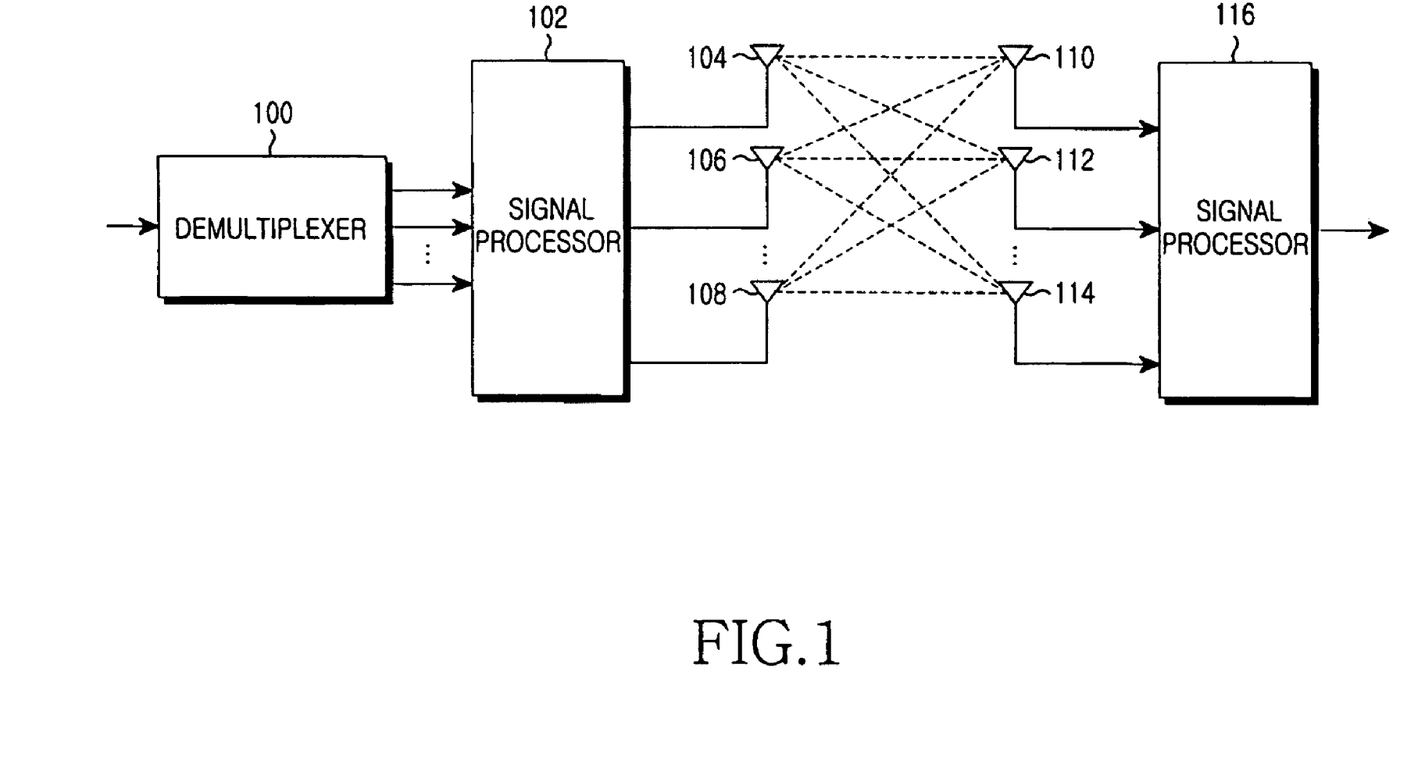
FIG. 1 is a block diagram illustrating a conventional multi-input multi-output (MIMO) mobile communication system.

FIG. 1 is a block diagram illustrating a conventional MIMO system. As shown in FIG. 1, a transmitter includes a demultiplexer 100, a signal processor 102 and transmission antennas 104, 106 and 108 and a receiver includes reception antennas 110, 112 and 114 and a signal processor 116. FIG. 1 shows only elements necessary for describing the principle of the MIMO system. Further, a plurality of inter-antenna channels are formed between the transmission antennas 104, 106 and 108 and the reception antennas 110, 112 and 114.

Referring to FIG. 1, the demultiplexer 100 demultiplexes a transmitted data stream into the same number of data streams as the number of the transmission antennas 104, 106 and 108, and outputs the multiplexed data streams. That is, the demultiplexer 100 duplicates each of the transmitted user data streams into the same number of data streams as the number of transmission antennas. Each of the user data streams is overlappingly transmitted through a multiple antenna in this manner, so that the error probability for the user data stream is reduced. Therefore, the reliability of the received user data stream can be improved. In other cases, the demultiplexer 100 receives the same number of data as the number of antennas and can output the received user data streams to transmission antennas.

The user data streams sent from the demultiplexer 100 experience a predetermined processing by the signal processor 102 and are then output to the transmission antennas 104, 106 and 108. The transmission antennas 104, 106 and 108 transmit the received user data streams to the reception antennas 110, 112 and 114. The reception antennas 110, 112 and 114 receive the user data streams transmitted from the transmission antennas 104, 106 and 108. That is, the reception antenna 110 receives the user data stream transmitted from the transmission antennas 104, 106 and 108, and the reception antenna 112 receives the user data stream transmitted from the transmission antennas 104, 106 and 108. Similarly, the reception antenna 114 receives the user data stream transmitted from the transmission antennas 104, 106 and 108. The reception antennas 110, 112 and 114 sends the received user data streams to the signal processor 116. The signal processor 116 performs a predetermined processing such as coding and modulation for the received user data streams.

The MIMO system may employ a bell labs layered space-time ('BLAST') scheme and a per-antenna rate control (PARC) scheme. Hereinafter, the BLAST scheme will be first described.

A transmitter of the BLAST scheme demultiplexes a user data stream into the same number of data streams as the number of transmission antennas and the transmission antennas use the same data rate. The BLAST scheme may be classified into a diagonal BLAST ('DBLAST') scheme, a vertical BLAST ('VBLAST') scheme and a horizontal BLAST (HBLAST) scheme. The DBLAST scheme performs a specific block coding for a user data stream transmitted from each transmission antenna, thereby improving efficiency. However, it is difficult to realize the DBLAST scheme. The VBLAST scheme performs an independent coding for a user data stream transmitted from each transmission antenna. In such a VBLAST scheme, the number of reception antennas is equal to or larger than that of transmission antennas and a receiver uses a maximum likelihood detection ('ML') scheme. In the ML scheme, symbols having a minimum error are selected through substitution of all symbols transmittable in all transmission antennas, so as to greatly improve performance of the antennas.

However, since the calculation amount increases due to the increase of the number of the transmission antennas, it is difficult to realize the ML scheme.

Meanwhile, the PARC scheme assigns data rates differently according to channel states experienced by each transmission antenna. The channel state may be expressed by a signal-to-interference and noise ratio (SINR).

Figure 2:
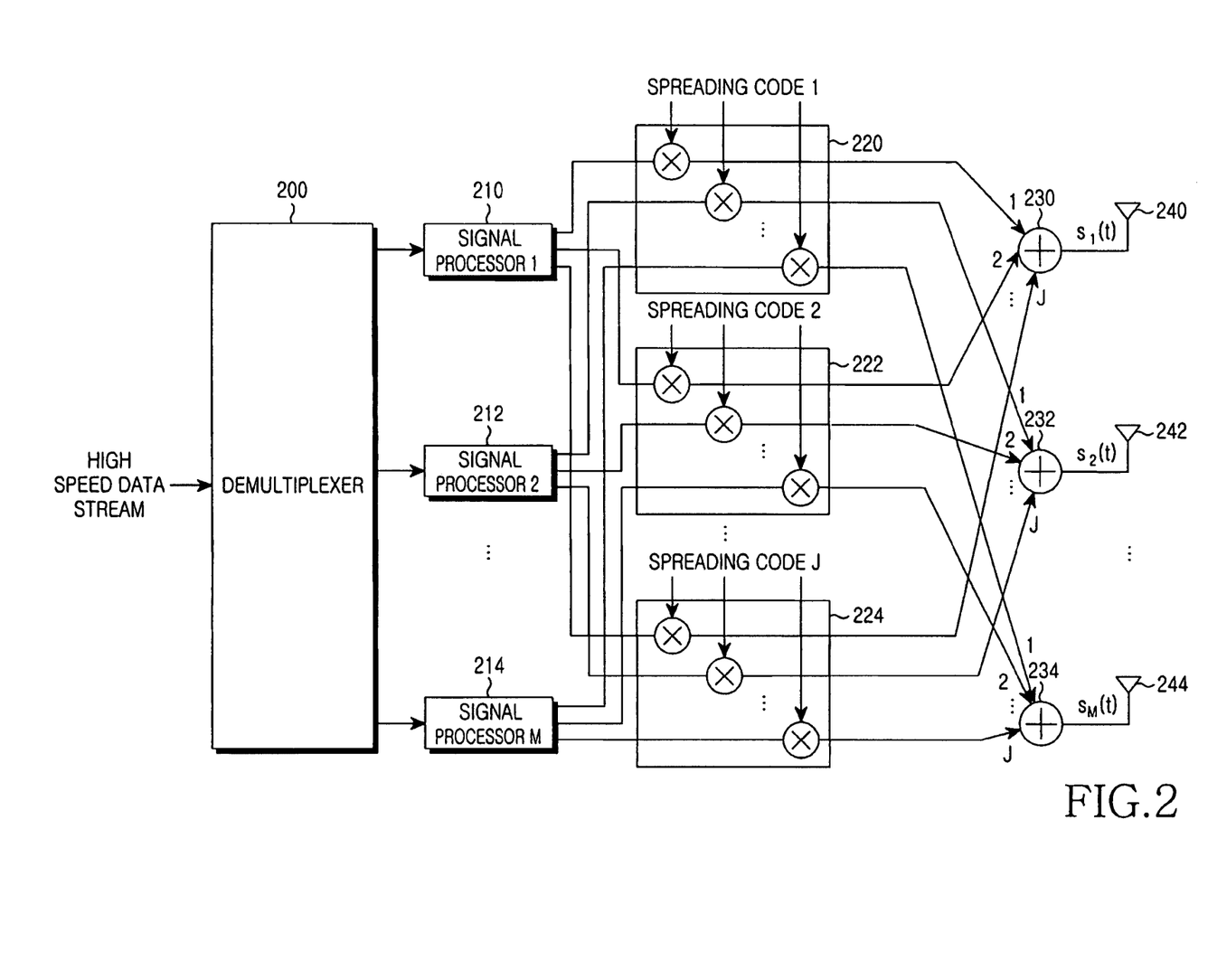
FIG. 2 is a block diagram illustrating a structure of a transmitter of an MIMO mobile communication system.

FIG. 2 is a block diagram showing a structure of a transmitter of a MIMO system using a PARC scheme. FIG. 2 shows a system capable of simultaneously transmitting J×M user data streams by means of J spreading codes and M transmission antennas.

The user data stream is transmitted to a demultiplexer 200. The demultiplexer 200 divides the user data stream by the J number of data according to the number of the transmission antennas and sends the divided user data streams to signal processors 210, 212 and 214. The signal processors 210, 212 and 214 perform a predetermined signal processing for the received user data streams.

Further, the signal processors 210, 212 and 214 perform a coding, an interleaving, a modulation, etc., for the received user data streams by means of preset data rates, respectively. The signal processors 210, 212 and 214 send the processed user data streams to spreaders 220, 222 and 224. Herein, the J output data streams processed by the signal processor 210 are respectively output to the spreaders 220, 222 and 224. Similarly, the signal processor 212 outputs the J output data streams to the spreaders 220, 222 and 224 and the signal processor 214 outputs the J output data streams to the spreaders 220, 222 and 224.

The spreaders 220, 222 and 224 use different spreading codes. The spreader 220 performs spreading for the user data streams sent from the signal processors 210, 212 and 214 by means of the same spreading code 1, the spreader 222 performs spreading for the user data streams sent from the signal processors 210, 212 and 214 by means of the same spreading code 2, and the spreader 224 performs spreading for the user data streams sent from the signal processors 210, 212 and 214 by means of the same spreading code J.

The user data streams that experienced the spreading by the spreaders 220, 222 and 224 are output to adders 230, 232 and 234. Herein, the user data streams (having experienced the coding/interleaving/modulation) processed by the same signal processor are output to the same adder. Specifically, the user data stream processed by the same signal processor 210 is output to the adder 230, the user data stream processed by the same signal processor 212 is output to the adder 232, and the user data stream processed by the same signal processor 214 is output to the adder 234.

The data stream added by the adder 230 according to each antenna is subjected to an additional signal processing (i.e., frequency up-conversion) of the transmitter and is then transmitted through a radio channel by a first transmission antenna 240 as a signal $S_1(t)$. Herein, since the additional signal processing is not directly associated with the main scope of the present invention, a detailed description will be omitted. Next, the data stream added by the adder 232 according to each antenna is subjected to the additional signal processing of the transmitter and is then transmitted through a radio channel by a second transmission antenna 242 as a signal $S_2(t)$. Last, the data stream added by the adder 234 according to each antenna is subjected to the additional signal processing of the transmitter and is then transmitted through a radio channel by an $M^{th}$ transmission antenna 244 as a signal $S_M(t)$.

Figure 3:
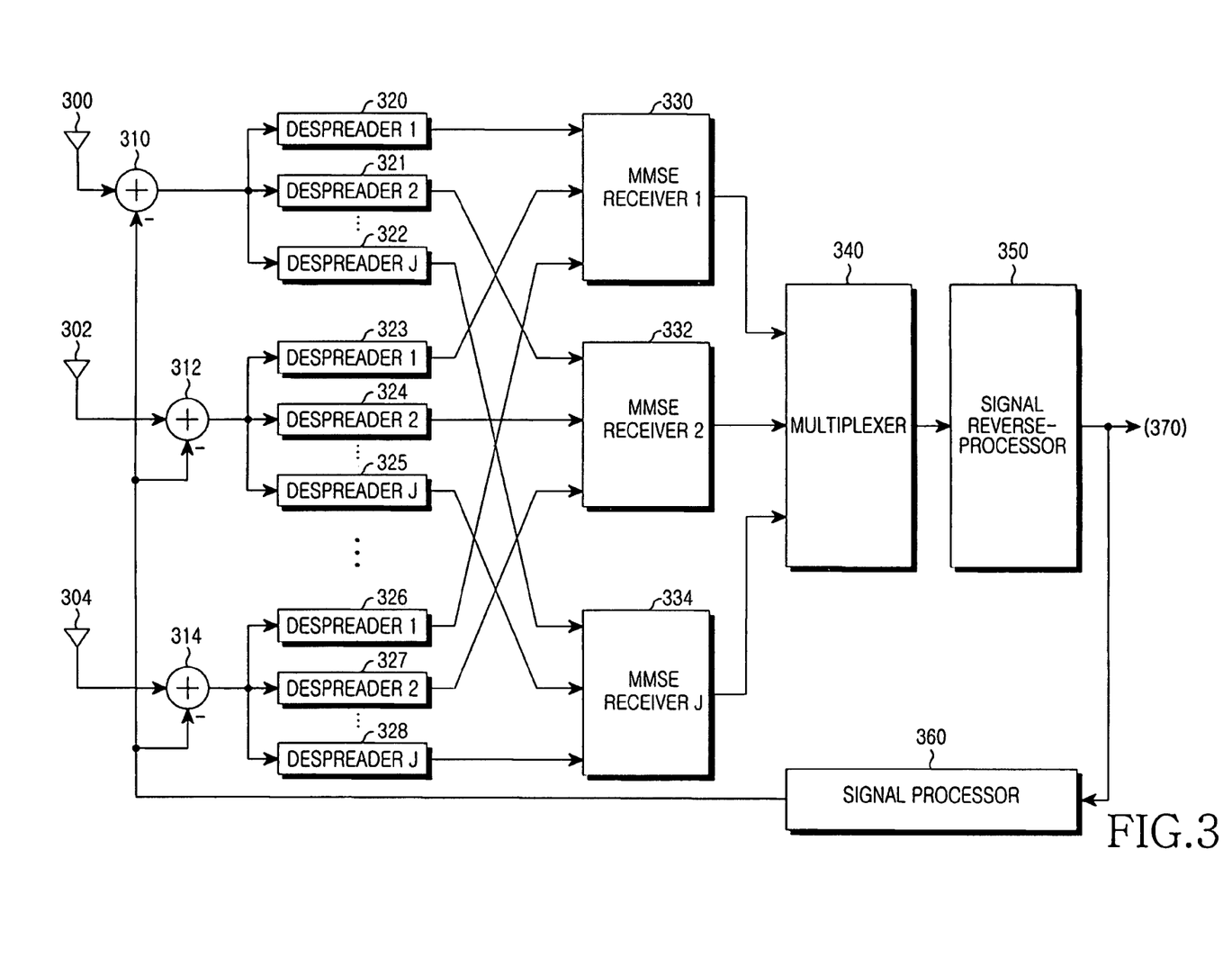
FIG. 3 is a block diagram illustrating a structure of a receiver of an MIMO mobile communication system.

FIG. 3 is a block diagram showing a structure of a receiver of an MIMO system using a PARC scheme. The structure of the receiver shown in FIG. 3 corresponds to the structure of the transmitter shown in FIG. 2.

Referring to FIG. 3, a reception antenna 300 receives the user data streams sent from the transmission antennas 240, 242 and 244. Referring to FIG. 2, the reception antenna 300 receives the signal sent from the transmission antennas 240, 242 and 244. Further, the reception antenna 302 receives the signal sent from the transmission antennas 240, 242 and 244 and the reception antenna 304 receives the signal sent from the transmission antennas 240, 242 and 244.

The reception antenna 300 sends the received signal to despreader 320 to 322, the reception antenna 302 sends the received signal to despreaders 323 to 325, and the reception antenna 304 sends the received signal to despreaders 326 to 328. Spreading codes used in the despreaders 320 to 328 are the same as those used in the spreaders 220, 222 and 224 of the transmitter. That is, the despreaders 320, the despreaders 323, the despreaders 326 and the spreader 220 of the transmitter use the same spreading codes. Further, the despreaders 321, the despreaders 324, the despreaders 327 and the spreader 222 of the transmitter use the same spreading codes. Similarly, the despreaders 322, the despreaders 325, the despreaders 328 and the spreader 224 of the transmitter use the same spreading codes.

The signal despreaded by the despreader 320 is output to a mean minimum square error ('MMSE') receiver 330, the signal despreaded by the despreader 321 is output to an MMSE receiver 332, the signal despreaded by the despreader 322 is output to an MMSE receiver 334, the signal despreaded by the despreader 323 is output to an MMSE receiver 330, the signal despreaded by the despreader 324 is output to an MMSE receiver 332, the signal despreaded by the despreader 325 is output to an MMSE receiver 334, the signal despreaded by the despreader 326 is output to an MMSE receiver 330, the signal despreaded by the despreader 327 is output to an MMSE receiver 332, and the signal despreaded by the despreader 328 is output to an MMSE receiver 334.

The MMSE receivers 330, 332 and 334 detect user data streams by a preset rule according to a spreading code of a specific transmission antenna. The detected user data streams of the specific transmission antenna are output to a multiplexer 340. The multiplexer 340 multiplexes the received user data streams of the specific transmission antenna and outputs the multiplexed data streams to a signal reverse-processor 350. The signal reverse-processor 350 detects the received data streams according to a preset antenna index sequence and performs a predetermined signal reverse-processing such as a demodulation, a deinterleaving, a decoding, etc. Herein, it is assumed that data streams are detected in a sequence of the first transmission antenna 240, the second transmission antenna 242 and the $J^{th}$ transmission antenna 244. Accordingly, in the first step, the transmission signal of the first transmission antenna 240 is detected.

The data stream of the first transmission antenna 240 reverse-processed by the signal reverse-processor 350 is output to the next terminal 370. In addition, the reverse-processed data stream of the first transmission antenna 240 is output to a signal processor 360. The signal processor 360 performs the signal processing equal to that of the transmitter for the data stream of the first transmission antenna 240 sent from the signal reverse-processor 350. The signal processing includes a coding, an interleaving and a modulation. In this manner, the signal processing is performed, so that the transmission signal estimated as a signal transmitted from the first transmission antenna 240 is reconstructed.

The reconstructed transmission signal of the first transmission antenna 240 is output to subtracters 310, 312 and 314. The subtracters 310, 312 and 314 subtract the reconstructed transmission signal of the first transmission antenna 240 from the signal received in the reception antennas 300, 302 and 304, and provides the subtraction result to the despreader 320 to 328. The aforementioned process is repeatedly performed up to the transmission signal of the $J^{th}$ transmission antenna. Therefore, the receiver can exactly receive the transmission signals sent from the transmitter while sequentially reducing the influence by the multiple transmission antenna.

In the conventional MIMO communication system as described above, a transmission signal of an $M^{th}$ transmission antenna is estimated by means of an estimated transmission signal of an $(M-1)^{th}$ transmission antenna. A scheme of estimating a transmission signal of a transmission antenna in this way is called a successive interference cancellation ('SIC') scheme. However, when an error occurs in estimating the transmission signal of the $(M-1)^{th}$ transmission antenna, an error also occurs in all following transmission signals estimated by means of the transmission signal of the $M^{th}$ transmission antenna. Accordingly, it is necessary to propose a scheme for solving the aforementioned problem caused by the characteristics of the SIC reception scheme.

SUMMARY OF THE INVENTION

Accordingly, the present invention has been made to solve the above-mentioned problems occurring in the prior art, and it is an object of the present invention to provide an apparatus and a method for reducing the influence of an error that occurred in a previous step in finding information of the next step.

It is another object of the present invention to provide an apparatus and a method for minimizing an error occurring on a radio channel by efficiently using information found in a previous step.

It is further another object of the present invention to provide a sequential interference cancellation apparatus and method having an error verification and correction function in a mobile communication system using a multi-input multi-output (MIMO) technology.

In order to accomplish the aforementioned objects, according to one aspect of the present, there is provided a method for receiving a plurality of signals that passed through a plurality of paths from a plurality of transmission antennas to a plurality of reception antennas in a mobile communication system that transmits/receives data at a high speed by means of the plurality of transmission antennas and the plurality of reception antennas, the method comprising the steps of a) estimating a transmission signal of a specific path from a first received signal received through each of the plurality of reception antennas according to a preset criterion; b) measuring an error component for each symbol of the estimated transmission signal; c) performing an error correction for symbols having a corresponding error component exceeding a preset value; d) detecting transmission data from all symbols including the error-corrected symbols through a predetermined signal reverse-processing procedure; e) reconstructing a transmission signal from the transmission data through a predetermined signal processing procedure; f) subtracting the reconstructed transmission signal from the received signal and generating a second received signal; and g) repeating steps a) through f) until transmission data of all paths are detected from the second received signal.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, an embodiment of the present invention will be described with reference to the accompanying drawings. In the following description of the present invention, a detailed description of known functions and configuration incorporated herein will be omitted for conciseness.

In a multi-input multi-output (MIMO) system in accordance with an embodiment of the present specification, a transmitter transmits data by means of M number of transmission antennas and J number of spreading codes and a receiver receives the data by means of N number of reception antennas. Hereinafter, the structure of a minimum mean square error successive interference cancellation (MMSE-SIC) receiver according to an embodiment of the present invention will be described with reference to FIG. 4. For convenience of description, a detailed description on a received signal that passed through each block and an operation of a conventional MMSE reception unit will be omitted.

Figure 4:
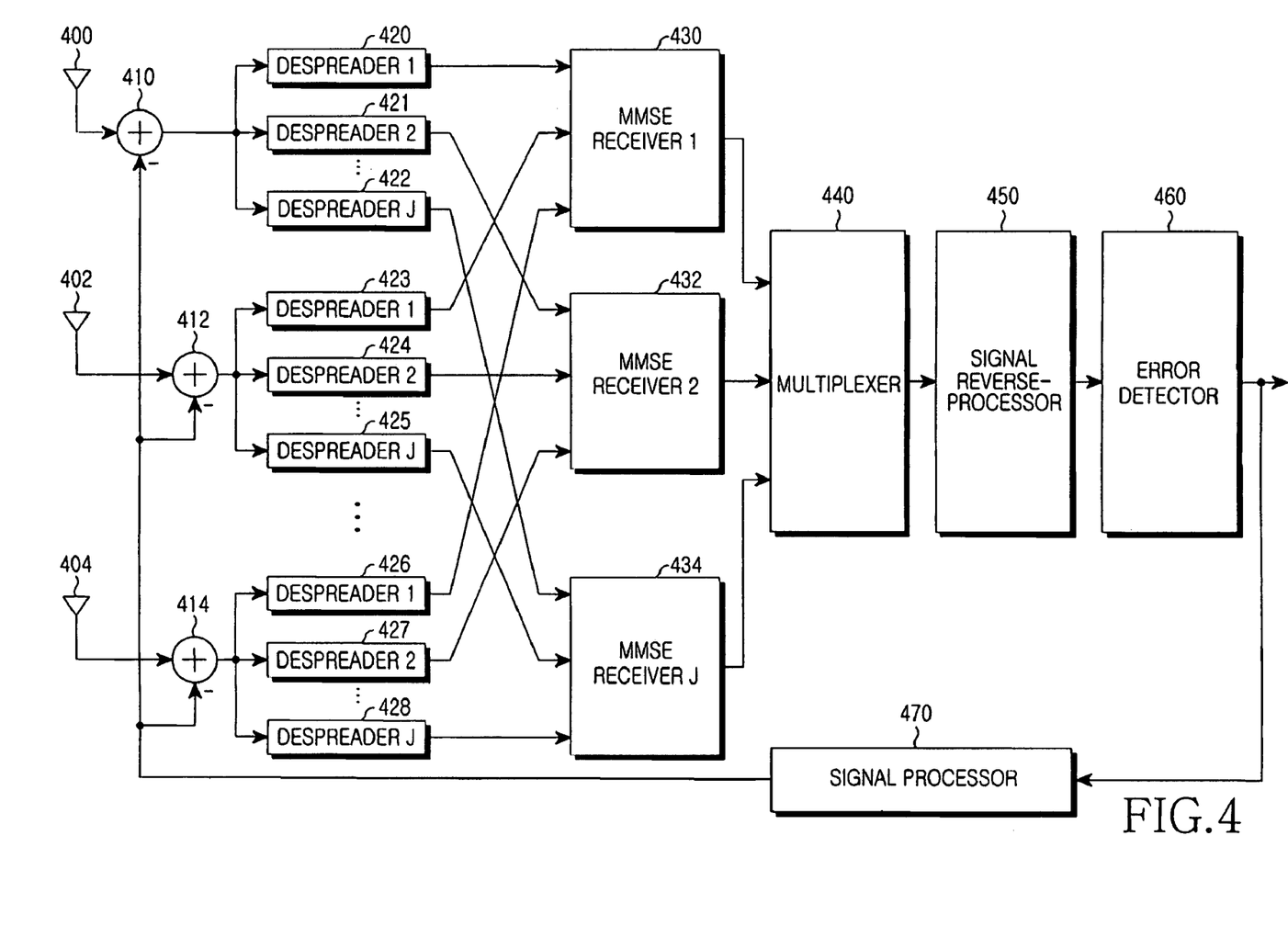
FIG. 4 is a block diagram illustrating a structure of a receiver of an MIMO mobile communication system according to an embodiment of the present invention.

Referring to FIG. 4, in a state in which a transmission signal of any transmission antenna is cancelled, a signal received through a first reception antenna 400 will be called $r^{(0)}(1)$, a signal received through a second reception antenna 402 will be called $r^{(0)}(2)$, and a signal received through an $N^{th}$ reception antenna 404 will be called $r^{(0)}(N)$. Here, it is apparent that the $r^{(0)}(N)$ may be expressed by a combination of signals $s_1$ to $s_m$ having experienced channels between M number of transmission antennas and a specific reception antenna. Here, the $s_m$ denotes a signal sent from an $M^{th}$ transmission antenna. Similarly, a signal received through an $N^{th}$ reception antenna after a $(i-1)^{th}$ interference cancellation step passes will be called $r^{(i)}(N)$.

The first reception antenna 400 sends the received signal to despreader 420 to 422, the reception antenna 402 sends the received signal to despreaders 423 to 425, and the Nth reception antenna 404 sends the received signal to despreaders 426 to 428. Spreading codes used in the despreaders 420 to 428 are the same as those used in the spreaders 220, 222 and 224 of the transmitter of FIG. 2. That is, the despreaders 420, the despreaders 423, the despreaders 426 and the spreader 220 of the transmitter use the same spreading codes. Further, the despreaders 421, the despreaders 424, the despreaders 427 and the spreader 222 of the transmitter use the same spreading codes. Similarly, the despreaders 422, the despreaders 425, the despreaders 428 and the spreader 224 of the transmitter use the same spreading codes.

The signal despreaded by the despreader 420 is output to a first MMSE receiver 430, the signal despreaded by the despreader 421 is output to a second MMSE receiver 432, the signal despreaded by the despreader 422 is output to an $J^{th}$ MMSE receiver 434, the signal despreaded by the despreader 423 is output to the first MMSE receiver 430, the signal despreaded by the despreader 424 is output to the second MMSE receiver 432, the signal despreaded by the despreader 425 is output to the $J^{th}$ MMSE receiver 434, the signal despreaded by the despreader 426 is output to the first MMSE receiver 430, the signal despreaded by the despreader 427 is output to the second MMSE receiver 432, and the signal despreaded by the despreader 428 is output to the $J^{th}$ MMSE receiver 434.

The MMSE receivers 430, 432 and 434 detect user data streams of each transmission antenna using a predetermined rule. Hereinafter, the functions of the MMSE receivers 430, 432 and 434 will be briefly described.

The following equation 1 denotes an $k^{th}$ signal received in an entire reception antenna:

$$r = \sqrt{\frac{\alpha^2}{M}} H \sum_{j=1}^{J} c(j)b(j) + n = \sqrt{\frac{\alpha^2}{M}} H \cdot s + n \qquad \text{Equation 1}$$

$\alpha^2$ is a normalized value of the power of a received signal, the c(j) denotes an $j^{th}$ spreading code, the b(j) denotes a signal input to an $j^{th}$ spreader, and the n denotes noise on a radio channel. Further, the s denotes [s(1), s(2), ..., s(m)] and the s(m) denotes the signal sent from the $M^{th}$ transmission antenna. The channel matrix H denotes a channel characteristic between all transmission/reception antennas and a channel characteristic between the $M^{th}$ transmission antenna and the $N^{th}$ reception antenna is $H_{mn}$.

A signal obtained by despreading the received signal r may be expressed by the following equation 2:

$$z(j) = c^*(j)r \qquad \text{Equation 2}$$
$$= c^*(j)\left(\sqrt{\frac{\alpha^2}{M}} Hc(j)b(j) + n\right)$$
$$= \sqrt{\frac{\alpha^2}{M}} H \cdot b(j) + n'$$

In equation 2, the z(j) denotes a signal obtained by despreading the reception signal of the entire reception antenna by an $j^{th}$ despreader and the $c^*(j)$ denotes a conjugate of the $j^{th}$ spreading code. Here, the despreaded signal z is a signal obtained by canceling a spreading code component contained in a transmission signal. Therefore, in order to obtain exact data transmitted from a transmission side, the channel component H must be cancelled. Accordingly, an MMSE reception unit including the multiple MMSE receivers 430, 432 and 434 calculates an MMSE linear transformation matrix as the following equation 3 in order to cancel the H component and minimize an error with the transmission signal:

$$w = \sqrt{\frac{M}{\alpha^2}} H\left(H*H + \frac{M}{\alpha^2}I\right)^{-1} \qquad \text{Equation 3}$$

The calculated W is an N×M matrix. Accordingly, an estimated value $\tilde{s} = W^* \cdot z$ of an entire transmission signal s is calculated by means of the W and is then output to a multiplexer.

Here, the z denotes [z(1), z(2), ..., z(j)] and is an N×J matrix. Further, the same number of the MMSE receivers as the number J of spreading codes are provided. Also, an $j^{th}$ MMSE receiver performs an operation for a z(j) vector of N×1 and M rows of W* denoting a channel component between the transmission antenna and the $N^{th}$ reception antenna.

When an MMSE result value for which a soft decision has been performed in an $i^{th}$ sequential interference cancellation step is a b(i), a multiplexer 400 in a first interference cancellation step multiplexes J number of received MMSE result values and generates an estimated value b(1). The estimated value b(1) is output to a signal reverse-processor 450.

Hereinafter, the construction and the operation of the signal reverse-processor 450 will be described.

The signal reverse-processor 450 performs a modulation, a deinterleaving, a decoding, etc., for the received estimated value, generates a hard decision result value, and outputs the hard decision result value to an error detector 460. The following equation 4 denotes a process by which a hard decision is performed:

$$\overline{b}(j) = sgn(b'(j)) \qquad \text{Equation 4}$$

The error detector 460 detects an error component from the received hard decision result value. The following equation 5 denotes the error component detected by the error detector 460:

$$e(j) = z(j) - \sqrt{\frac{\alpha^2}{M}} N\overline{b}(j) \qquad \text{Equation 5}$$

The e(j) denotes the size of the error component that occurred in a signal spread by a spreading code j on a radio channel. Accordingly, the size of an error component for a transmission signal of a transmission antenna m may be expressed by the following equation 6:

$$E = [e(1)e(2) \ldots e(J)] = Z - \sqrt{\frac{\alpha^2}{M}} H\overline{B} \qquad \text{Equation 6}$$

The Z denotes [z(1)z(2) ... z(j)] and the $\overline{B}$ denotes [$\overline{b}(1)$ $\overline{b}(2)$ ... $\overline{b}(J)$]. When an absolute value for an error for the $j^{th}$ spreading signal is obtained by means of the E, the absolute value may be expressed by the following equation 7:

$$\varepsilon_j = |e_j| = \left| z_j \sqrt{\frac{\alpha^2}{M}} H\overline{b}_j \right| \quad J = i, 2, \ldots, J \qquad \text{Equation 7}$$

When the error for the $j^{th}$ spreading code is larger than a reference value k, it can be recognized that an error for the MMSE result value has occurred in the $j^{th}$ spreading code.

Hereinafter, a construction and an operation of an embodiment of the present invention for interference cancellation will be described.

First, a signal-to-interference and noise ratio (SINR) of each transmission antenna is calculated for the interference cancellation. Next, data are detected and interference is cancelled in a sequence of a transmission antenna having a high SINR and a transmission antenna having a low SINR. If it is assumed that transmission signal power of each transmission antenna is equal to each other, an SINR may be calculated by the following equation 8:

$$SINR(m) = \frac{\frac{\alpha^2}{M}|w_m^* h_m|^2}{\frac{\alpha^2}{M} \sum_{k=1, k \neq m}^{M} |w_m^* h_k|^2 + w_m^* w_m} \qquad \text{Equation 8}$$

Further, a transmission antenna symbol sequence having the highest SINR is detected from transmission symbols of each transmission antenna and a maximum likelihood detection (ML) scheme is applied to the detected symbol sequence. Herein, the ML scheme is not performed for all detected transmission symbols of each transmission antenna, but performed for only a symbol in which the size of the error component for the received symbol shown in equation 6 exceeds a preset value.

For instance, for the size of the error component for the received symbol shown exceeds the preset value and others do not exceed the predetermined value, in equation 6, when only a size e(1) of an error component for a first code symbol the ML scheme is performed for only the first code symbol.

If a Quaternary Phase Shift Keying (QPSK) modulation scheme has been used, a possible symbol combination $F=\{v_1, v_2, \ldots, v_q\}$ of the first code symbol will be $\{00, 01, 10, 11\}$. That is, the receiver puts the all possible symbols into the first code symbol and determines an optimal symbol. Then, the receiver replaces the first code symbol with the optimal value, detects the transmission antenna symbol sequence having the highest SINR, and outputs the transmission antenna symbol sequence. Hereinafter, a symbol of data which has been spread by the $j^{th}$ spreading code and transmitted through a first transmission antenna will be called $b_{1j}$ and an estimated transmission symbol will be called $v_q$.

Accordingly, a value of a signal transmitted from the first transmission antenna and estimated by means of the estimated transmission symbol becomes $\hat{B}$. When the $b_{1j}$ is estimated as the $v_q$ by the ML scheme, a size of an error component for the estimated symbol may be expressed by the following equation 9:

$$E(b_{1j} = v_q) = Z - \sqrt{\frac{\alpha^2}{M}} H\hat{B}(b_{1j} = v_q) \quad \text{Equation 9}$$

The following equation 10 denotes a case in which there exist three reception symbols in which a size of an error component exceeds the preset value when a SINR size of a transmission signal is aligned in a sequence of a transmission antenna index in a system having a transmission antenna (M=4) and a spreading code (J=8). That is, e(2), e(3), e(6) are larger than the preset value:

Equation 10

As shown in equation 10, since the first transmission antenna has the highest SINR, an ML process is performed for the transmission symbol of the first transmission antenna. Accordingly, the receiver performs the ML process for $b_{12}$, $b_{13}$ and $b_{16}$. The transmission symbol sequence of the first transmission antenna obtained by replacing the $b_{12}$, $b_{13}$ and $b_{16}$ with the optimal $v_q$ is output to a signal reconstruction unit 470.

The signal reconstruction unit 470 performs a predetermined signal processing for the transmission symbol sent from the error detector 460 and reconstructs a transmission signal estimated as a signal transmitted from a specific transmission antenna. The signal processing is equal to the processing that was performed for the transmission symbol sequence of the first transmission antenna in the transmitter and includes a coding, an interleaving, a modulation, etc.

The symbols having passed through the signal processing are output to subtracters 410, 412 and 414. The subtracters 410, 412 and 414 perform a function of canceling the symbols that passed through the signal processing from user data streams received through reception antennas. Signals output from the subtracters 410, 412 and 414 are sent to the despreaders 420 to 428.

The above embodiment has described an example in which an ML process is applied to only a symbol sequence of a transmission antenna having the highest SINR (i.e., of a first path), but a path (i.e., the number of transmission antennas) to which the ML process is applied may be changed according to a selection.

Figure 5:
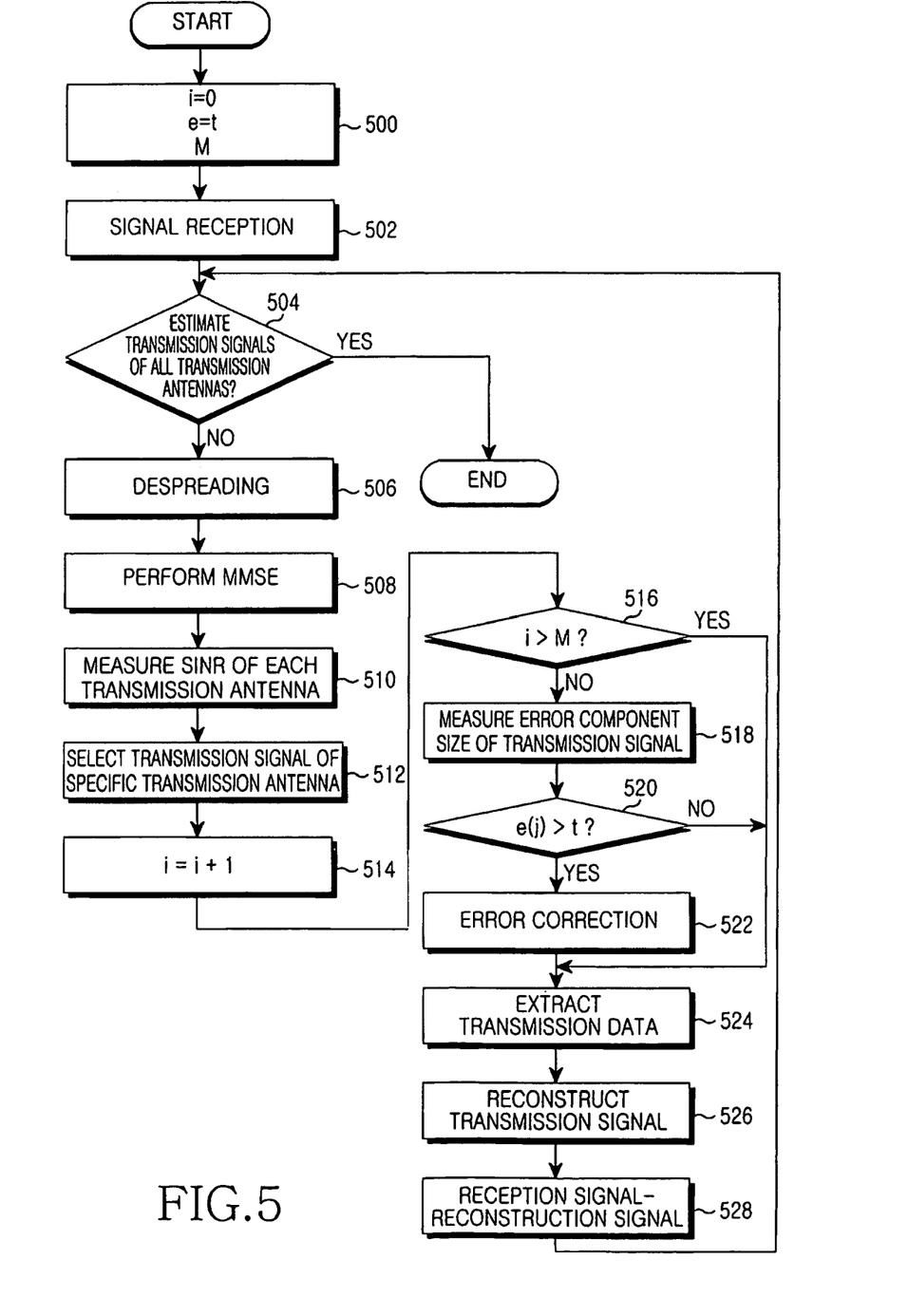
FIG. 5 is flow diagram illustrating an operation in a receiver of an MIMO mobile communication system according to an embodiment of the present invention.

FIG. 5 is flow diagram illustrating an operation in a receiver according to a preferred embodiment of the present invention.

Referring to FIG. 5, in step 500, the receiver initializes the number i of times of searching for a transmission signal of a transmission antenna to be 0 and sets the number M of transmission antennas and a preset value t of an error component to which an ML process is to be applied. In step 502, signals sent from each transmission antenna are received in the receiver. The receiver includes two or more reception antennas and each reception antenna receives the transmission signal from each transmission antenna. In step 504, the receiver determines whether or not transmission data have been extracted from the transmission signals from all transmission antennas. As a result of the determination, when the transmission data have not been extracted from the transmission signals from all transmission antennas, step 506 is performed. In contrast, when the transmission data have been extracted from the transmission signals from all transmission antennas, the receiver ends all procedures.

In step 506, the receiver performs a despreading process for a received signal of each reception antenna. Spreading codes used in the despreading process are equal to those used in a transmitter. That is, the spreading codes includes spreading codes 1 to J and the received signal of each reception antenna is despread by the spreading codes 1 to J.

In step 508, the receiver performs an MMSE process for the signals despread by the same spreading codes by the same number as the number of the spreading codes. That is, the MMSE process is performed for the received signals despread by the spreading code 1 and the MMSE process is performed for the received signals despread by the spreading code 2. In step 510, the receiver measures an SINR of each transmission antenna. Then, step 512 is performed. That is, in step 512, among the measured SINRs of each transmission antenna, the receiver searches for transmission signals corresponding to the preset number of transmission antennas from the highest SINR.

In step 514, the receiver counts the number i of times of searching for the transmission signal of the transmission antenna. Then, step 516 is performed. That is, in step 516, when the i is larger than the number M of transmission antennas to which the ML process is to be applied, step 524 is performed. In contrast, when the i is not larger than the number M of transmission antennas to which the ML process is to be applied, step 518 is performed. In step 518, the receiver measures an error component of the transmission signal. Then, step 520 is performed. That is, in step 520, the receiver selects symbols in which the error component measurement result exceeds a preset value t from the searched symbols of the transmission symbol sequence of the transmission antenna. When there are symbols in which the error component measurement result exceeds the preset value t, step 522 is performed. In contrast, when there are no symbols in which the error component measurement result exceeds the preset value t, step 524 is performed.

In step 522, the receiver performs an error correction for the symbols in which the error component measurement result exceeds the preset value t according to the ML scheme. Then, step 524 is performed. That is, in step 524, the receiver extracts transmission data sent from the searched transmission antenna from the error-corrected symbol sequence. Then, step 526 is performed. Herein, a symbol sequence already stored in a previous time point may be used. In step 526, the receiver reconstructs a transmission signal from the extracted transmission data of the transmission antenna. Then, step 528 is performed. Herein, a method of reconstructing the transmission signal can be obtained by applying the signal processing method used in the transmitter to the extracted transmission data. In step 528, the receiver cancels the reconstructed transmission signal of the transmission antenna from an antenna reception signal in a previous time. Then, returns to step 504. In step 504, the receiver determines whether or not transmission data have been extracted from the transmission signals from all transmission antennas. Then, the aforementioned processes are repeated.

A process of canceling an exact signal in which an error has been corrected according to the method as proposed above is sequentially performed, so a received signal estimation process is performed for all transmission antennas.

Figure 6:
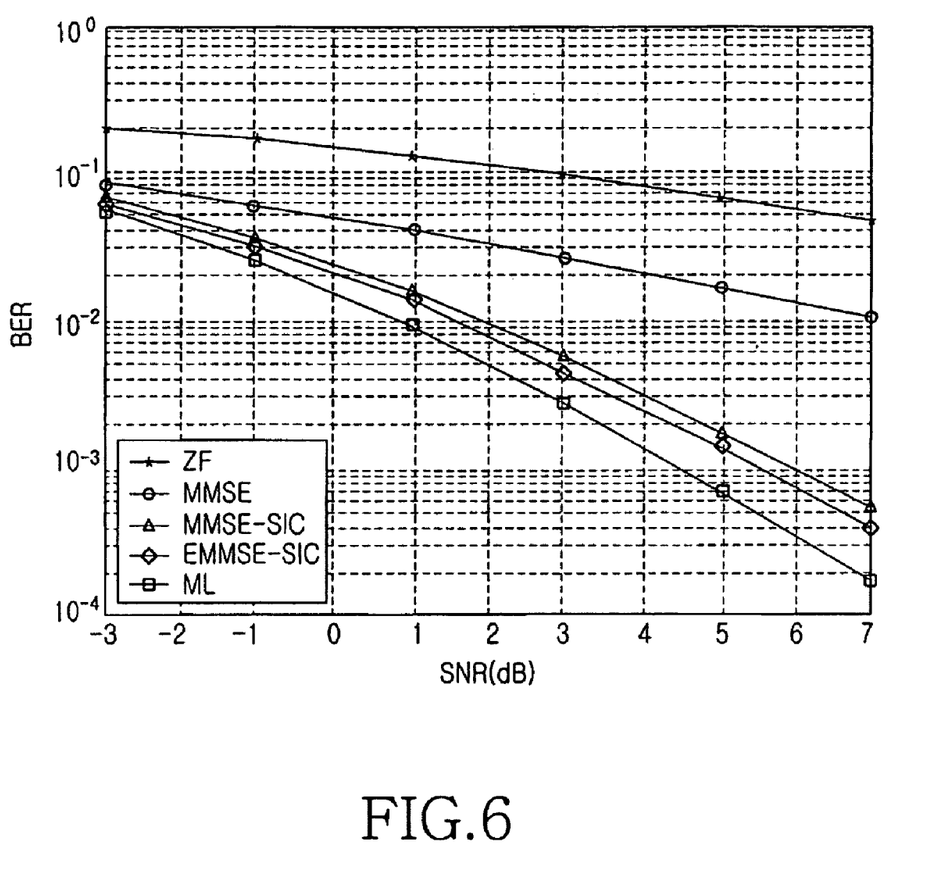
FIG. 6 is a graph comparing a bit error rate ('BER') for a signal-to-noise ratio (SNR) for an embodiment of the present and to the prior art.
Figure 7:
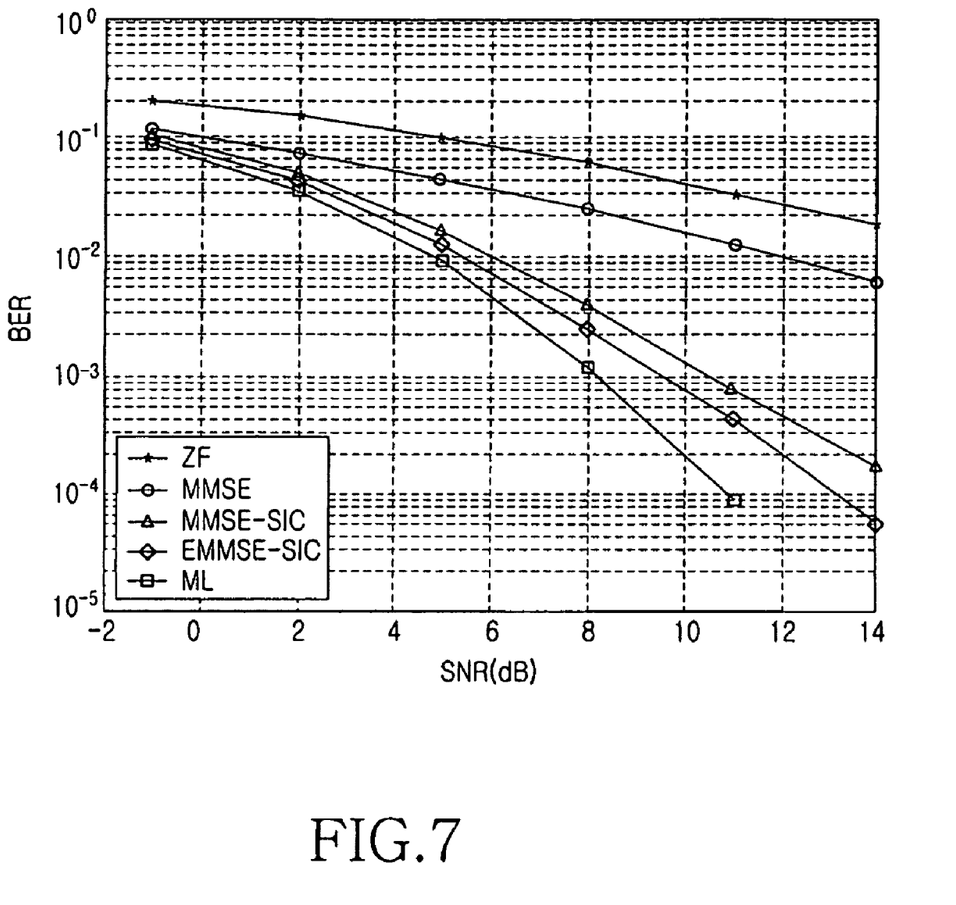
FIG. 7 is another graph comparing a bit error rate for a signal-to-noise ratio for an embodiment of the present and to the prior art.

FIGS. 6 and 7 are graphs comparing the embodiment of the present invention with the prior art. FIGS. 6 and 7 show a bit error rate ('BER') for a signal-to-noise ratio (SNR). Specifically, FIG. 6 shows a case in which a Binary Phase Shift Key (BPSK) modulation scheme is used and FIG. 7 shows a case in which a QPSK modulation scheme is used. FIGS. 6 and 7 show cases in which a Zero Forcing (ZF) scheme, an MMSE scheme, an MMSE-SIC scheme, an enhanced MMSE-SIC scheme ('EMMSE-SIC scheme') according to an embodiment of the present invention, and an ML scheme are used. Referring to FIGS. 6 and 7, the EMMSE-SIC scheme according to an embodiment of the present invention has the lowest BER except for the ML scheme. Further, when it is considered that the ML scheme has a very high complexity, the EMMSE-SIC scheme according to an embodiment of the present invention can obtain the highest efficiency.

As described above, in an embodiment of the present invention, when the size of an error component for a received signal is larger than a preset value, the error for the received signal is partially cancelled, so that the reliability for the received signal can be improved. Further, in an embodiment of the present invention, another signal is estimated by means of the signal having a partially improved reliability, so that error improvement can be realized.

Although a certain embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for receiving a plurality of signals having passed through a plurality of paths from a plurality of transmission antennas to a plurality of reception antennas in a mobile communication system that transmits/receives data at a high speed by means of the plurality of transmission antennas and the plurality of reception antennas, the method comprising the steps of:
   a) estimating a transmission signal of a specific path from a first received signal received through each of the plurality of reception antennas according to a preset criterion via a receiver;
   b) measuring an error component for each symbol of the estimated transmission signal via an error detector;
   c) performing an error correction for symbols having a corresponding error component exceeding a preset value via the error detector;
   d) detecting transmission data from all symbols including the error-corrected symbols through a predetermined signal reverse-processing procedure via the error detector;
   e) reconstructing a transmission signal from the transmission data through a predetermined signal processing procedure via a signal reconstruction unit;
   f) subtracting the reconstructed transmission signal from the received signal and generating a second received signal via a subtractor; and
   g) repeating steps a) through f) until transmission data of all paths are detected from the second received signal.

2. The method as claimed in claim 1, wherein step a) further comprises a step of estimating a transmission signal having a highest signal-to-interference and noise ratio (SINR) of at least one path from among the plurality of paths.

3. The method as claimed in claim 1, wherein the receiver comprises a MMSE receiver.

4. An apparatus for receiving signals through a plurality of antennas in a mobile communication system that inputs a sequence of coding bits and outputs information bits, the apparatus comprising:
   despreaders for despreading each sequence of modulation symbols received through the plurality of antennas by a despreading code identical to the despreading code used in a transmission apparatus;
   a mean minimum square error (MMSE) receiver for detecting an error component for the despread modulation symbols; and
   an error detector for selecting modulation symbols having an error component higher than a preset value and estimating a transmission symbol for the selected modulation symbols.

5. The apparatus as claimed in claim 4, wherein the MMSE receiver receives an equal number of symbols as a number of transmission antennas for one symbol period.

6. The apparatus as claimed in claim 5, wherein the MMSE receiver detects an error component of a reception symbol corresponding to the modulation symbol of the transmission antenna having a highest signal-to-interference and noise ratio (SINR) from among the received symbols and outputs the detected reception symbol.

7. The apparatus as claimed in claim 6, further comprising a signal reverse-processor for performing a modulation, a deinterleaving and a decoding for an output symbol of the MMSE receiver.

8. The apparatus as claimed in claim 7, further comprising a signal reconstruction unit for performing a coding, an interleaving and a modulation for the transmission symbol estimated by the error detector and reconstructing a modulation symbol.

9. The apparatus as claimed in claim 8, further comprising subtracters for subtracting the reconstructed modulation symbol from the modulation symbols received through the plurality of antennas.

10. A method for receiving signals through a plurality of antennas in a mobile communication system that inputs a sequence of coding bits and outputs information bits, the method comprising the steps of:
   despreading each sequence of modulation symbols received through the plurality of antennas by a despreading code identical to the despreading code used in a transmission apparatus via a despreader;
   detecting an error component for the despread modulation symbols via an error detector;
   selecting modulation symbols having an error component higher than a present value the error detector; and
   estimating a transmission symbol for the selected modulation symbols via the error detector.

11. The method as claimed in claim 10, wherein the step of detecting the error component comprises the steps of:
   receiving an equal number of symbols as a number of transmission antennas for one symbol period;
   detecting an error component of a reception symbol corresponding to the modulation symbol of the transmission antenna having a highest signal-to-interference and noise ratio (SINR) from among the received symbols; and
   outputting the detected reception symbol.

12. The method as claimed in claim 11, wherein the step of detecting the error component further comprises a step of performing a modulation, a deinterleaving and a decoding for the detected reception symbol.

13. The method as claimed in claim 12, further comprising a step of performing a coding, an interleaving and a modulation for the estimated transmission symbol and reconstructing a modulation symbol.

14. The method as claimed in claim 13, further comprising a step of subtracting the reconstructed modulation symbol from the modulation symbols received through the plurality of antennas.

* * * * *

UNITED STATES PATENT AND TRADEMARK OFFICE
CERTIFICATE OF CORRECTION

PATENT NO.        : 7,590,166 B2
APPLICATION NO.   : 11/001704
DATED             : September 15, 2009
INVENTOR(S)       : Oh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1317 days.

Signed and Sealed this

Twenty-first Day of September, 2010

David J. Kappos
*Director of the United States Patent and Trademark Office*